United States Patent
Kumar et al.

(10) Patent No.: US 12,346,449 B2
(45) Date of Patent: Jul. 1, 2025

(54) FORMING MODULAR CHASSIS TRUSTED GROUPS FOR PRE-BOOT AUTHENTICATION OF BLADE SERVERS

(71) Applicant: Dell Products L.P., Round Rock, TX (US)

(72) Inventors: Suren Kumar, Bangalore (IN); Akbar Sheriff, Salem (IN); Thanuja Chayakumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 221 days.

(21) Appl. No.: 17/876,523

(22) Filed: Jul. 28, 2022

(65) Prior Publication Data

US 2024/0037241 A1    Feb. 1, 2024

(51) Int. Cl.
G06F 21/57    (2013.01)
G06F 21/33    (2013.01)

(52) U.S. Cl.
CPC ............ G06F 21/575 (2013.01); G06F 21/33 (2013.01); *G06F 2221/034* (2013.01)

(58) Field of Classification Search
CPC ... G06F 21/575; G06F 21/33; G06F 2221/034
See application file for complete search history.

(56) References Cited

U.S. PATENT DOCUMENTS

| | | | |
|---|---|---|---|
| 12,235,743 B2* | 2/2025 | Lee | G06F 11/2094 |
| 2006/0179294 A1* | 8/2006 | Chu | G06F 9/4405 |
| | | | 713/2 |
| 2010/0024001 A1* | 1/2010 | Campbell | G06F 21/71 |
| | | | 726/2 |
| 2011/0214159 A1* | 9/2011 | Kuroda | H04L 63/10 |
| | | | 726/3 |
| 2017/0083457 A1* | 3/2017 | Khemani | G06F 12/1466 |
| 2018/0278472 A1* | 9/2018 | Rathineswaran | H04L 41/0813 |
| 2018/0287791 A1* | 10/2018 | Basavarajaiah | H04L 63/04 |
| 2019/0356486 A1* | 11/2019 | Vishwanath | H04L 9/3239 |

* cited by examiner

*Primary Examiner* — Michael Simitoski
*Assistant Examiner* — Zhe Liu
(74) *Attorney, Agent, or Firm* — Jackson Walker L.L.P.

(57) ABSTRACT

Disclosed methods maintain security key information, including a unique security key, for one or more blade servers inserted in slots of one or more modular chassis. Following an indication of a logical trusted group comprising a plurality of slots, a trusted group database, including the security key information for each blade server in a slot of the trusted group, is maintained. Responsive to detecting movement of a blade server between two slots of the trusted group, a pre boot process of the server blade in the second slot is automatically authenticated via the security key information in the trusted group database. If a blade server not associated with the trusted group is inserted into a trusted group slot, automatic authentication is blocked and the user is prompted to manually authenticate the new blade server. If manual authentication is successful, security key information for the new blade is added to the database.

15 Claims, 4 Drawing Sheets

FORMING MODULAR CHASSIS TRUSTED GROUPS FOR PRE-BOOT AUTHENTICATION OF BLADE SERVERS

TECHNICAL FIELD

The present disclosure relates to information handling system security and, more particularly, authentication of pre-boot process.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems are configured to respond to a reset event by executing a pre-boot process before loading an operating system (OS). In at least some systems, including at least enterprise class server systems, the pre-boot process must be authenticated before the OS is loaded. Historically, at least a portion of the pre-boot process has been referred to as a basic input/output sequence (BIOS) and the pre-boot authentication is supported by a BIOS password or a BIOS password token.

A modular chassis refers to an information handling system product designed to host multiple blade servers, which may also be referred to simply as blades. A commercially distributed example of a modular chassis is an MX7000 Modular Chassis from Dell Technologies. In the context of a modular chassis housing multiple blade servers, authenticating the pre-boot process may require an IT administrator to manually enable a BIOS password token for each blade.

SUMMARY

Subject matter disclosed herein addresses the absence of a centralized method to manage and coordinate the pre-boot and pre-boot authentication processes from a modular chassis console such the OpenManagaement Enterprise Modular edition (OME-M) from Dell Technologies. In some cases, network authentication exists; however, the IT administrator may be required to maintain multiple authentication servers within the infrastructure, which is an undesirable and potentially challenging requirement.

The absence of an integrated method for authenticating the user log-in process during the pre-boot of the blade server before the standard OS log-in process has undesirable consequences. IT administrators may be required to manage and maintain the BIOS password of every blade server. In addition, at least some conventional modular chassis management resources may lack functionality to detect and prevent unauthorized blade insertions and/or blade relocations within in the chassis.

In accordance with subject matter disclosed in the following description, a modular chassis management (MCM) resource is provisioned with a centralized, integrated pre-boot authentication intelligence resource. The resource may support options for creating a logical trusted group wherein the pre-boot process of any blade that has been relocated within the trusted group is automatically authenticated.

In one aspect, disclosed methods and systems generate and maintain security key information, including a unique security key, for each of one or more blade servers inserted in slots of one or more modular chassis. Responsive to detecting an indication of a logical trusted group comprising a plurality of slots including one or more slots from each of one or more modular chassis, a trusted group database, including the security key information for each blade server inserted in a slot of the logical trusted group, is maintained. Responsive to detecting movement of a blade server between two slots of the logical trusted group, i.e., from a first slot of the logical trusted group to a second slot of the logical trusted group, a pre boot process of the server blade in the second slot via the security key information for the server blade in the trusted group database is automatically authenticated.

In addition, responsive to detecting insertion of a new blade server, i.e., a blade server not associated with the trusted group database, into a slot of the logical trusted group, automatic authentication of the new blade server is prevented and a user is prompted to manually authenticate the new blade server. If the manual authentication is successful, security key information for the new blade server is generated and the security key information of the new blade server is stored in the trusted group database such that the new blade server will be automatically authenticated for any subsequent movement to another slot of the logical trusted group.

Generating the security key information for a blade server may include deriving a security token for the blade server based on inventory information including, for example, information identifying the blade server and information identifying the modular chassis. The identifying information may include a service tag, inventory tag, serial number, etc. The unique security key for the blade server may then be based on the security token. In such embodiments, the security key information may include the unique security key and the security token. The inventory information may include any one or more of: an inventory tag of the modular chassis, an inventory tag of the blade server, and a media access control (MAC) address of the management controller. The security token may include a sequence of alpha numeric characters randomly selected from the inventory information.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
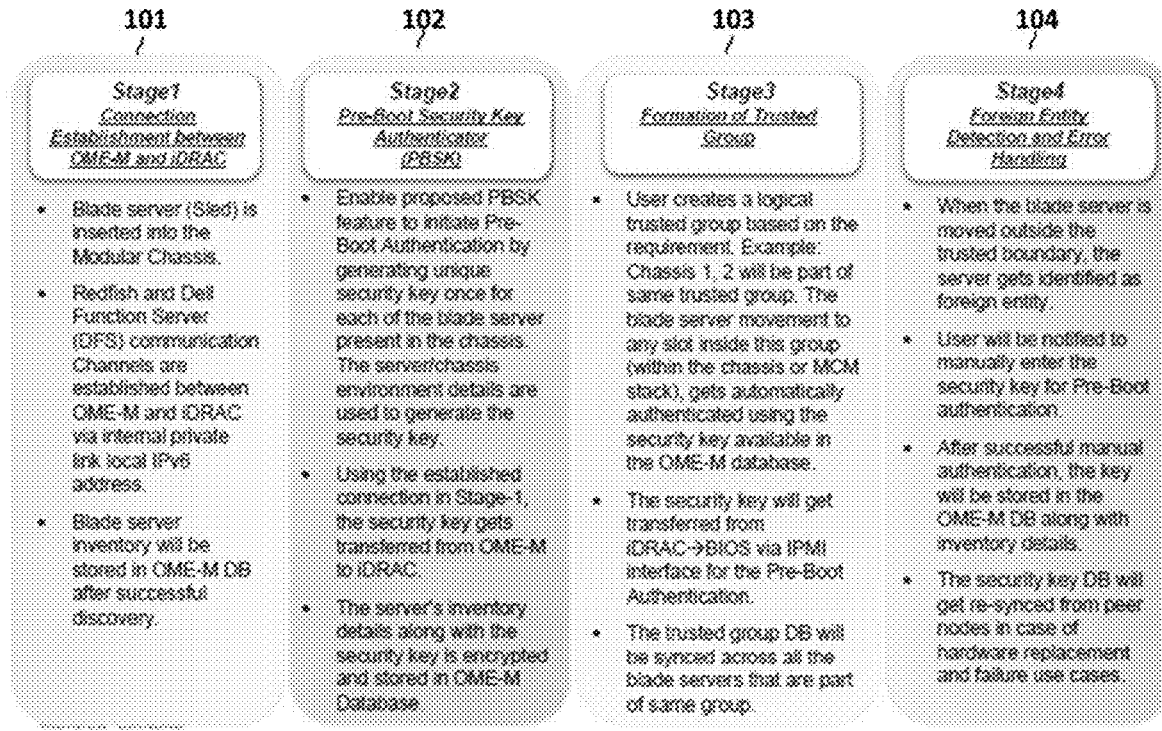
FIG. 1 illustrates an exemplary method for implementing trusted groups of modular chassis blades in accordance with disclosed teachings.
Figure 2:
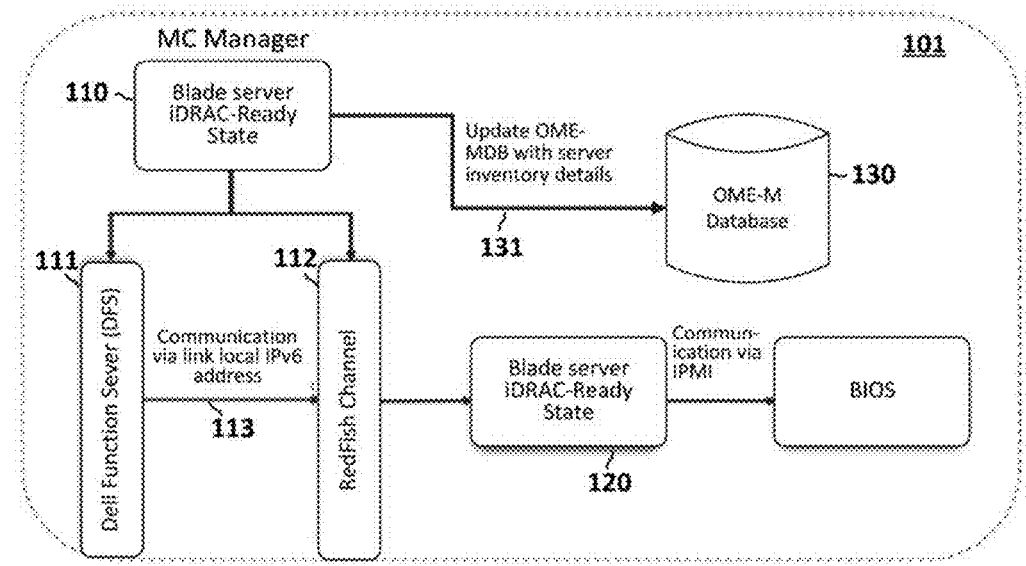
FIG. 2 illustrates detail of an exemplary first stage of the method of FIG. 1.

Exemplary embodiments and their advantages are best understood by reference to FIGS. 1-8, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an exemplary process 100 for enabling logical trusted groups of blade servers and other modular resources within one or more modular chassis (MC) products managed by an MC manager (MCM) such as an OME-M. The process 100 illustrated and described in FIG. 1 pre-supposes that each blade includes a management controller such as a baseboard management controller (BMC), remote access controller (RAC), or another suitable management controller. Although the illustrated process refers to a particular brand of MCM, the OME-M from Dell Technologies, and a particular brand of a management controller, the iDRAC from Dell Technologies, those of ordinary skill in the field will appreciate that the illustrated components are not exclusive or restrictive.

The process 100 illustrated in FIG. 1 includes four stages 101-104. During Stage 1 (101) as additionally depicted in FIG. 2, when a blade is inserted in the modular chassis and the blade's management controller indicates a ready state, one or more communication channel connections are established between the MCM resource 110 (e.g., an OME-M resource) and the blade's management controller (e.g., BMC 120). The communication channels illustrated in FIG. 2 include a Dell Function Server (DFS) connection 111 and a Redfish channel 112 coupling MCM 110 to BMC 120 via a link local IPv6 address 113. After successful discovery, the blade server is added (step 131) to a blade server inventory stored in an OME-M database 130.

Figure 3:
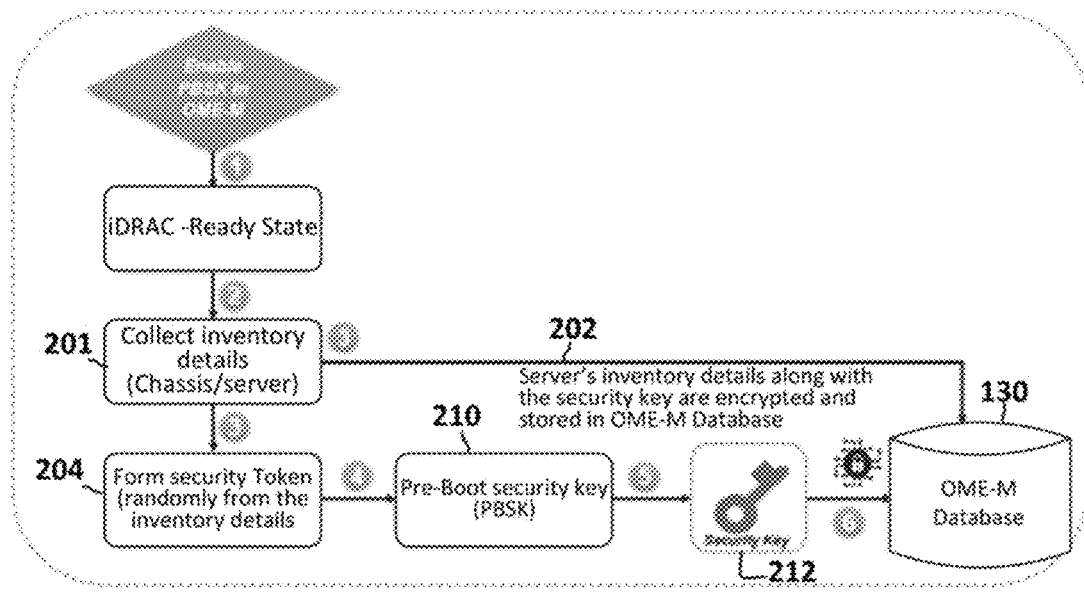
FIG. 3 illustrates detail of an exemplary second stage of the method of FIG. 1.

FIG. 3 illustrates detail of the Stage 2 (102) described above. As additionally depicted in FIG. 3, a unique security key is generated once for each blade server included in the modular chassis. As illustrated in FIG. 3 inventory details are collected (step 201) and stored (step 202) in the OME-M database 130. The inventory details are also used to randomly form (step 204) a security token based on the inventory details. The security token is then provided to a pre-boot security key module 210, which encrypts the token and the inventory information with a secure key 212 and stores the encrypted data in OME-M database 130. Using the communication channel connection established during stage 1 (101), the security key is transferred from OME-M to the blade's iDRAC.

Figure 4:
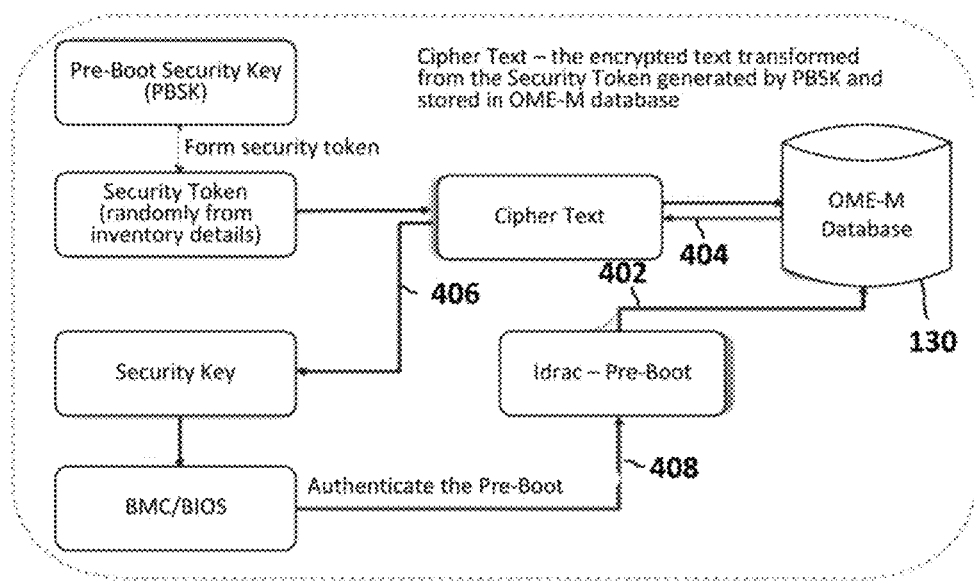
FIG. 4 illustrates an exemplary method for generating two-factor pre-boot security keys.

FIG. 4 illustrates automatic authentication of a blade server's pre-boot process based on the unique security key. After the security information is stored to OME-M database 130, automatic authentication begins with a blade server's management controller, identified in FIG. 4 as iDRAC, sending (402) a request to authenticate the pre-boot process to OME-M database 130. In response, OME-M database 130 fetches (404) a security key based on identity information for the iDRAC. The security key fetched from OME-M database 130 is then delivered (406) to the blade's BIOS. BIOS then forwards (408) the security key to the iDRAC, which can verify the security key against security information stored to the iDRAC when the security key was first created.

Figure 5:
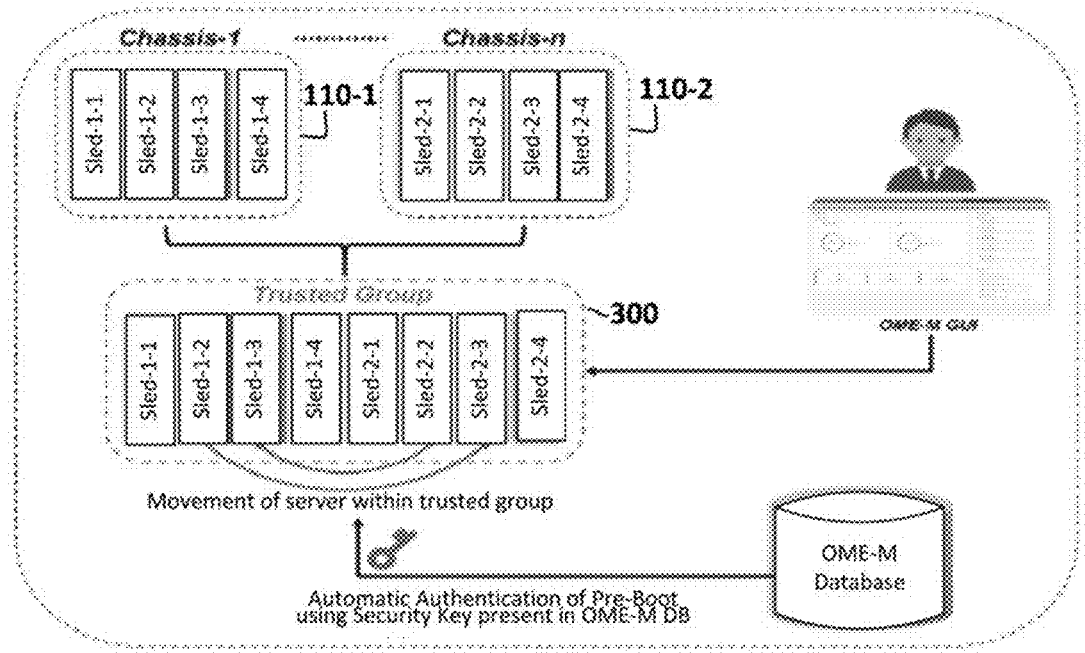
FIG. 5 illustrates detail of an exemplary third stage of the method of FIG. 1.

FIG. 5 illustrates detail of the Stage 3 (103) of FIG. 1. As depicted in FIG. 5, an IT administrator creates a logical trusted group (LTG) 300 based on applicable requirement(s). The LTG 300 illustrated in FIG. 5 comprises eight slots, also referred to as sleds, including four blades from a first modular chassis 110-1 and four sleds from a second modular chassis 110-2. FIG. 5 illustrates an automated pre-boot authentication using the security key in OME-M database. In at least one embodiment, the security key is transferred from iDRAC to BIOS via IPMI interface for the Pre-Boot Authentication. The trusted group database will be synced across all blade servers that are part of same trusted group.

Figure 6:
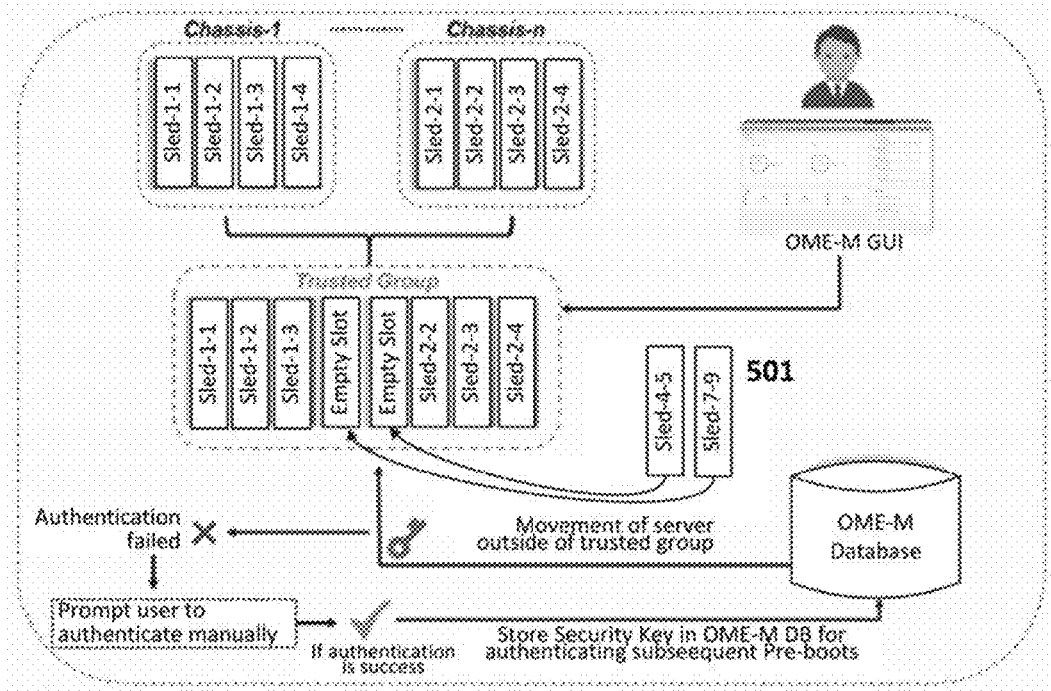
FIG. 6 illustrates additional detail of foreign entity detection and error handling features of a trusted server group implementation.

FIG. 6 illustrates detail of the Stage 4 (104) illustrated in FIG. 1. FIG. 6 illustrates detecting and error handling associated with foreign entities, including blades from outside of a trusted group. When an "outside" blade server 501 from beyond the trusted group boundary is inserted into a trusted group slot, blade server 501 is identified and processed as a foreign entity. The administrator or other user will be notified to manually enter the security key for pre-boot authentication. After successful manual authentication, the key will be stored in the OME-M database along with inventory details. The security key database will get re-synced from peer nodes in case of hardware replacement and failure use cases.

Figure 7:
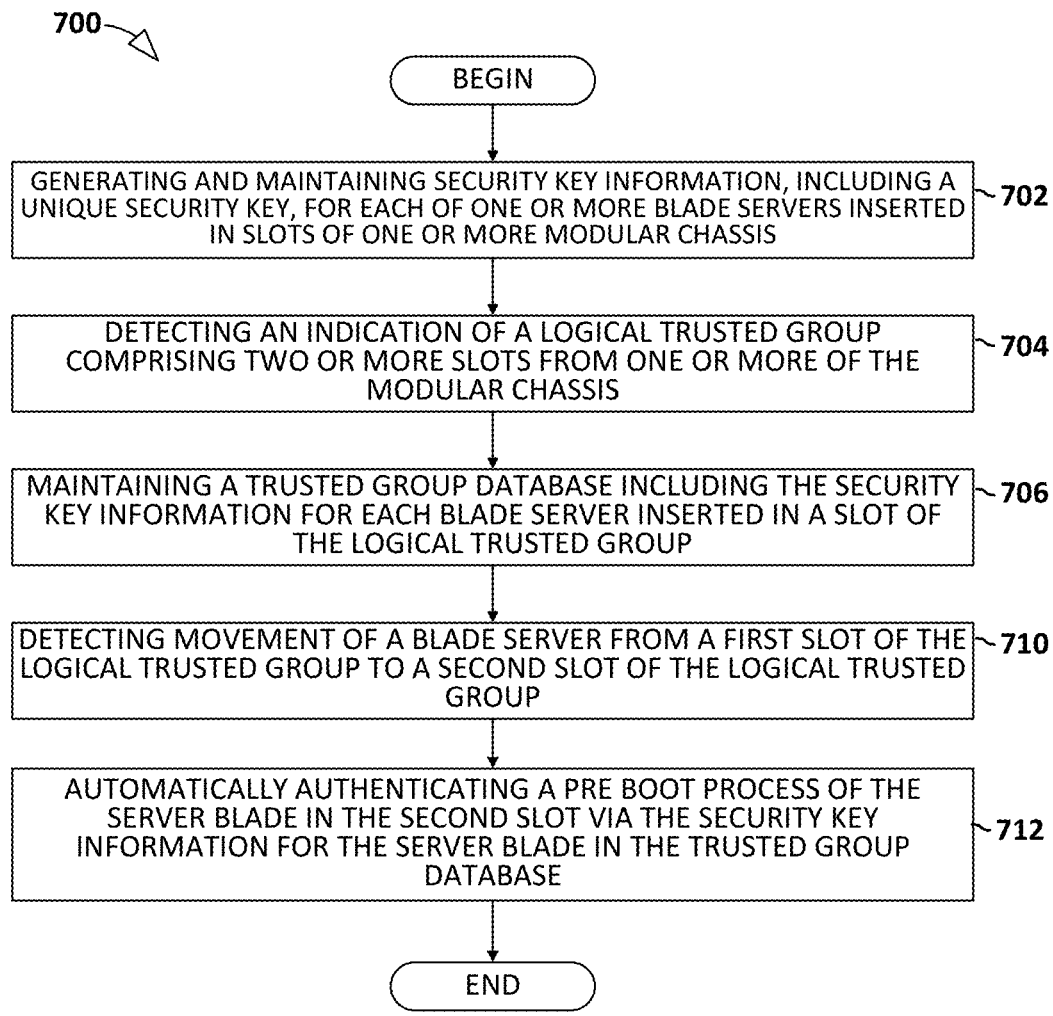
FIG. 7 illustrates a method for maintaining and employing trusted groups of modular chassis slots to automatically authenticate blades when moved within a trusted group.
Figure 8:
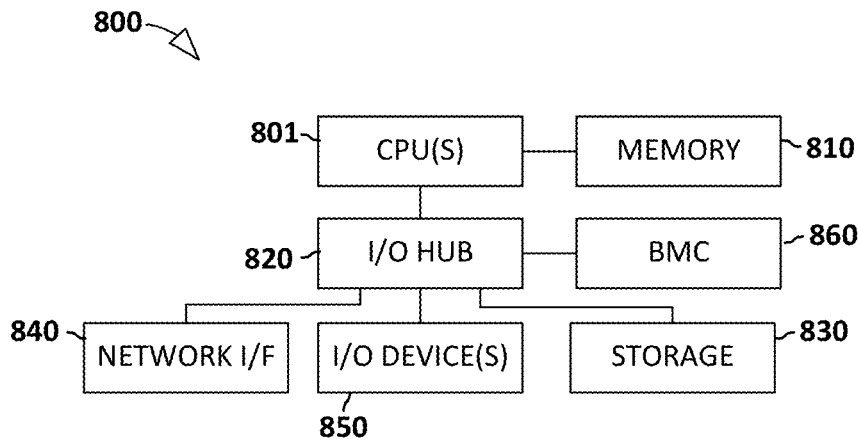
FIG. 8 illustrates an exemplary information handling system suitable for use in conjunction with disclosed subject matter.

Referring now to FIG. 7, a flow diagram illustrates a method 700 for employing logical trusted groups to automatically authenticate server blades moved between slots of a logical trust group. The illustrated method includes generating and maintaining (702) security key information, including a unique security key, for each of one or more blade servers inserted in slots of one or more modular chassis.

Responsive to detecting (704) an indication of a logical trusted group comprising two or more slots from one or more of the modular chassis, a trusted group database is maintained (706) to include the security key information for each blade server inserted in a slot of the logical trusted group. Upon detecting (710) movement of a blade server from a first slot of the logical trusted group to a second slot of the logical trusted group, a pre boot process of the server blade in the second slot is automatically authenticated (712) via the security key information for the server blade in the trusted group database Referring now to FIG. 8, any one or more of the elements illustrated in FIG. 1 through FIG. 7 may be implemented as or within an information handling system exemplified by the information handling system 800 illustrated in FIG. 8. The illustrated information handling system includes one or more general purpose processors or central processing units (CPUs) 801 communicatively coupled to a memory resource 810 and to an input/output hub 820 to which various I/O resources and/or components are communicatively coupled. The I/O resources explicitly depicted in FIG. 8 include a network interface 840, commonly referred to as a NIC (network interface card), storage resources 830, and additional I/O devices, components, or resources 850 including as non-limiting examples, keyboards, mice, displays, printers, speakers, microphones, etc. The illustrated information handling system 800 includes a baseboard management controller (BMC) 860 providing, among other features and services, an out-of-band management resource which may be coupled to a management server (not depicted). In at least some embodiments, BMC 860 may manage information handling system 800 even when information handling system 800 is powered off or powered to a standby state. BMC 860 may include a processor, memory, an out-of-band network interface separate from and physically isolated from an in-band network interface of information handling system 800, and/or other embedded information handling resources. In certain embodiments, BMC 860 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising:
generating and maintaining security key information, including a unique security key, for each of one or more blade servers inserted in slots of one or more modular chassis;
responsive to detecting an indication of a logical trusted group comprising two or more slots including one or more slots from each of two or more of the modular chassis, maintaining a trusted group database including the security key information for each blade server inserted in a slot of the logical trusted group;
responsive to detecting movement of a blade server from a first slot of the logical trusted group to a second slot of the logical trusted group, automatically authenticating a pre boot process of the server blade in the second slot via the security key information for the server blade in the trusted group database; and
responsive to detecting insertion of a new blade server, comprising a blade server not associated with the trusted group database, into a slot of the logical trusted group, prompting a user to manually authenticate the new blade server.

2. The method of claim 1, further comprising, responsive to a successful manual authentication of the new blade server, generating security key information for the new blade server and storing the security key information of the new blade server in the trusted group database.

3. The method of claim 1, wherein generating security key information for a blade server comprises:
deriving a security token for the blade server based on inventory information including information identifying the blade server and information identifying the modular chassis; and
generating the unique security key for the blade server based on the security token, wherein the security key information includes the unique security key and the security token.

4. The method of claim 3, wherein the inventory information includes at least one of:
an inventory tag of the modular chassis;
an inventory tag of the blade server; and
a media access control (MAC) address of a management controller.

5. The method of claim 4, wherein the security token comprises a sequence of alpha numeric characters randomly selected from the inventory information.

6. An information handling system, comprising:
a central processing unit (CPU); and
a computer readable memory including processor executable instructions that, when executed by the CPU, cause the information handling system to perform operations including:
generating and maintaining security key information, including a unique security key, for each of one or more blade servers inserted in slots of one or more modular chassis;
responsive to detecting an indication of a logical trusted group comprising two or more slots including one or more slots from each of two or more of the modular chassis, maintaining a trusted group database including the security key information for each blade server inserted in a slot of the logical trusted group;
responsive to detecting movement of a blade server from a first slot of the logical trusted group to a second slot of the logical trusted group, automatically authenticating a pre boot process of the server blade in the second slot via the security key information for the server blade in the trusted group database; and
responsive to detecting insertion of a new blade server, comprising a blade server not associated with the trusted group database, into a slot of the logical trusted group, prompting a user to manually authenticate the new blade server.

7. The information handling system of claim 6, wherein the operations further include, responsive to a successful manual authentication of the new blade server, generating security key information for the new blade server and storing the security key information of the new blade server in the trusted group database.

8. The information handling system of claim 6, wherein generating security key information for a blade server comprises:
deriving a security token for the blade server based on inventory information including information identifying the blade server and information identifying the modular chassis; and
generating the unique security key for the blade server based on the security token, wherein the security key information includes the unique security key and the security token.

9. The information handling system of claim 8, wherein the inventory information includes at least one of:
an inventory tag of the modular chassis;
an inventory tag of the blade server; and
a media access control (MAC) address of a management controller.

10. The information handling system of claim 9, wherein the security token comprises a sequence of alpha numeric characters randomly selected from the inventory information.

11. A non-transitory computer readable medium including processor executable instructions that, when executed by a processor of an information handling system, cause the information handling system to perform operations comprising:
generating and maintaining security key information, including a unique security key, for each of one or more blade servers inserted in slots of one or more modular chassis;
responsive to detecting an indication of a logical trusted group comprising two or more slots including one or more slots from each of two or more of the modular chassis, maintaining a trusted group database including the security key information for each blade server inserted in a slot of the logical trusted group;
responsive to detecting movement of a blade server from a first slot of the logical trusted group to a second slot of the logical trusted group, automatically authenticating a pre boot process of the server blade in the second slot via the security key information for the server blade in the trusted group database; and responsive to detecting insertion of a new blade server, comprising a blade server not associated with the trusted group database, into a slot of the logical trusted group, prompting a user to manually authenticate the new blade server.

12. The computer readable medium of claim 11, further comprising, responsive to a successful manual authentication of the new blade server, generating security key information for the new blade server and storing the security key information of the new blade server in the trusted group database.

13. The computer readable medium of claim 11, wherein generating security key information for a blade server comprises;
   deriving a security token for the blade server based on inventory information including information identifying the blade server and information identifying the modular chassis; and
   generating the unique security key for the blade server based on the security token, wherein the security key information includes the unique security key and the security token.

14. The computer readable medium of claim 13, wherein the inventory information includes at least one of:
   an inventory tag of the modular chassis;
   an inventory tag of the blade server; and
   a media access control (MAC) address of a management controller.

15. The computer readable medium of claim 14, wherein the security token comprises a sequence of alpha numeric characters randomly selected from the inventory information.

* * * * *